United States Patent [19]

Larson et al.

[11] Patent Number: 4,772,793

[45] Date of Patent: Sep. 20, 1988

[54] DEAD-TIME COMPENSATION FOR A LOGARITHMIC DISPLAY RATE METER

[75] Inventors: John A. Larson; Frederick P. Krueger, both of Aurora, Ill.

[73] Assignee: The United States of America as represented by the United States Department of Energy, Washington, D.C.

[21] Appl. No.: 104,029

[22] Filed: Oct. 5, 1987

[51] Int. Cl.$^4$ .............................................. G01T 1/18
[52] U.S. Cl. .................................... 250/374; 307/234
[58] Field of Search ................... 250/336.1, 369, 374; 307/234, 492; 328/110, 145

[56] References Cited

U.S. PATENT DOCUMENTS

| | | | |
|---|---|---|---|
| 3,814,937 | 6/1974 | Lowes | 250/374 X |
| 4,288,692 | 9/1981 | Schanber et al. | 250/310 |
| 4,292,539 | 9/1981 | Todd | 250/374 |
| 4,311,909 | 1/1982 | Utting et al. | 250/374 |
| 4,419,579 | 12/1983 | East | 250/374 |
| 4,423,329 | 12/1983 | De Burgos Garcia et al. | 250/374 |
| 4,491,733 | 1/1985 | Wasserman | 250/374 |
| 4,617,680 | 10/1986 | Johnston | 250/374 |

FOREIGN PATENT DOCUMENTS 1179406  1/1970  United Kingdom ................ 250/374

Primary Examiner—Eugene R. LaRoche
Assistant Examiner—Steven J. Mottola
Attorney, Agent, or Firm—Hugh W. Glenn; Paul A. Gottlieb; Judson R. Hightower

[57] ABSTRACT

An improved circuit is provided for application to a radiation survey meter that uses a detector that is subject to dead time. The circuit compensates for dead time over a wide range of count rates by producing a dead-time pulse for each detected event, a live-time pulse that spans the interval between dead-time pulses, and circuits that average the value of these pulses over time. The logarithm of each of these values is obtained and the logarithms are subtracted to provide a signal that is proportional to a count rate that is corrected for the effects of dead time. The circuit produces a meter indication and is also capable of producing an audible indication of detected events.

9 Claims, 6 Drawing Sheets

DEAD-TIME COMPENSATION FOR A LOGARITHMIC DISPLAY RATE METER

CONTRACTUAL ORIGIN OF THE INVENTION

The United States has rights in this invention pursuant to Contract No. DE-AC02-76CH03000 between the U.S. Department of Energy and University Research Association, Inc.

BACKGROUND OF THE INVENTION

This invention relates to apparatus for surveying radiation. In particular, this invention relates to a circuit for application in a radiation survey meter to correct for counting losses and resulting inaccuracies due to dead time in the detector and the count-rate circuit.

In radiation monitoring, several types of detectors are used to sense the presence of photons and particles that comprise radiation that may be harmful to humans. These detectors include Geiger-Mueller (GM) tubes, scintillator-photomultiplier combinations, and proportional counters. Each of these devices produces an output pulse in response to the passage of a photon or a charged particle in a specified energy range through a measuring region of the detector. The passage of such a photon or particle disables the detector briefly during a period that is referred to as dead time. A particle or photon that passes through the measuring region during the dead time will not produce an output and therefore will not be counted. The actual dead time of a GM tube is typically of the order of tens to hundreds of microseconds, depending upon the tube type, and it varies slightly from tube to tube of a given type. The actual dead time of scintillator-photomultiplier combinations and proportional counters is typically less than that of all but the fastest-recovering GM tubes.

When the count rate is low, the effect of dead time is negligible. However, when the count rate approaches the order of the reciprocal of the dead time, the dead time causes the observed counting rate to be significantly different from the actual counting rate. Thus, in order to provide an indication of the actual counting rate, it is necessary to correct for the dead time.

The problem is formulated mathematically in "Radiological Health Handbook," published by the U.S. Department of Health, Education and Welfare, Bureau of Radiological Health, January 1970, p. 121. It is restated by Todd, U.S. Pat. No. 4,292,539, entitled "Compensated Count-Rate Circuit for Radiation Survey Meter," which is assigned to the assignee of the present invention and which is incorporated here by reference as if set forth fully. Todd observes that, for random inputs, the actual count per unit time (N) is related to the observed count per unit time (n) by the relation $$N = \frac{n}{1 - nt_d} \quad (1)$$

where $t_d$ is the dead time of the system and $nt_d$ is always less than or equal to one.

Various attempts have made in the past to correct for dead time in a rate meter with a logarithmic scale. One method that has been used is to reduce the sensitivity of the detector. This reduces the effect of dead time, but sacrifices precision in measuring low count rates, which are the rates most detected in applications involving health physics. Another means of accounting for dead time that has been used is to determine a correction empirically and apply that correction across the range of values measured. This has the disadvantage that such an empirical correction is typically specific to a particular tube, and must be revised when the tube is changed. A third method that has been used is to add a linear element in series with a log-determining component, which provides a correction that is adequate to about 20% dead time. A fourth that has been applied is the simultaneous switching of detectors and ranges to extend the dynamic range of the instrument beyond two decades. This has the disadvantage of potentially causing operator confusion regarding the scale or scale multiplier in use. Thus, there is a need for an improved circuit to correct for dead time in logarithmic rate meters.

SUMMARY OF THE INVENTION

It is an object of the present invention to provide a better means of correcting for dead time in a rate meter.

It is a further object of the present invention to provide an electronic circuit that corrects logarithmically for the dead time in the electronic circuit associated with a Geiger-Mueller counter.

It is a further object of the present invention to provide an electronic circuit that corrects electronically for the dead time associated with the electronic circuit that serves a proportional counter.

It is a further object of the present invention to provide an electronic circuit that compensates for the dead time associated with the electronic circuit that is connected to a photo-multiplier.

It is a further object of the present invention to provide an electronic circuit that corrects for dead time in a rate meter without reducing the sensitivity of the rate meter.

It is a further object of the present invention to provide an electronic circuit that corrects for dead time in a rate-meter without applying an empirical correction across the range of values measured.

It is a further object of the present invention to provide a circuit that corrects for dead time in a rate meter without adding a linear element in series with a log-determining element.

It is a further object of the present invention to provide a circuit that corrects for dead time in a rate meter without applying a different fixed correction in each of a plurality of ranges.

Other objects will become apparent in the course of a detailed description of the invention.

In keeping with one aspect of this invention, an improved circuit is provided for application to a radiation survey meter that uses a detector that is subject to dead time. The circuit compensates for dead time over a wide range of count rates by producing a dead-time pulse for each detected event, a live-time pulse spanning the interval between dead-time pulses, and circuits that average the value of these pulses over time. The logarithm of each of these values is obtained and the logarithms are subtracted to provide a signal that is proportional to a count rate that is corrected for the effects of dead time. The circuit produces a meter indication and is also capable of producing an audible indication of detected events.

DETAILED DESCRIPTION OF THE INVENTION

Figure 1:
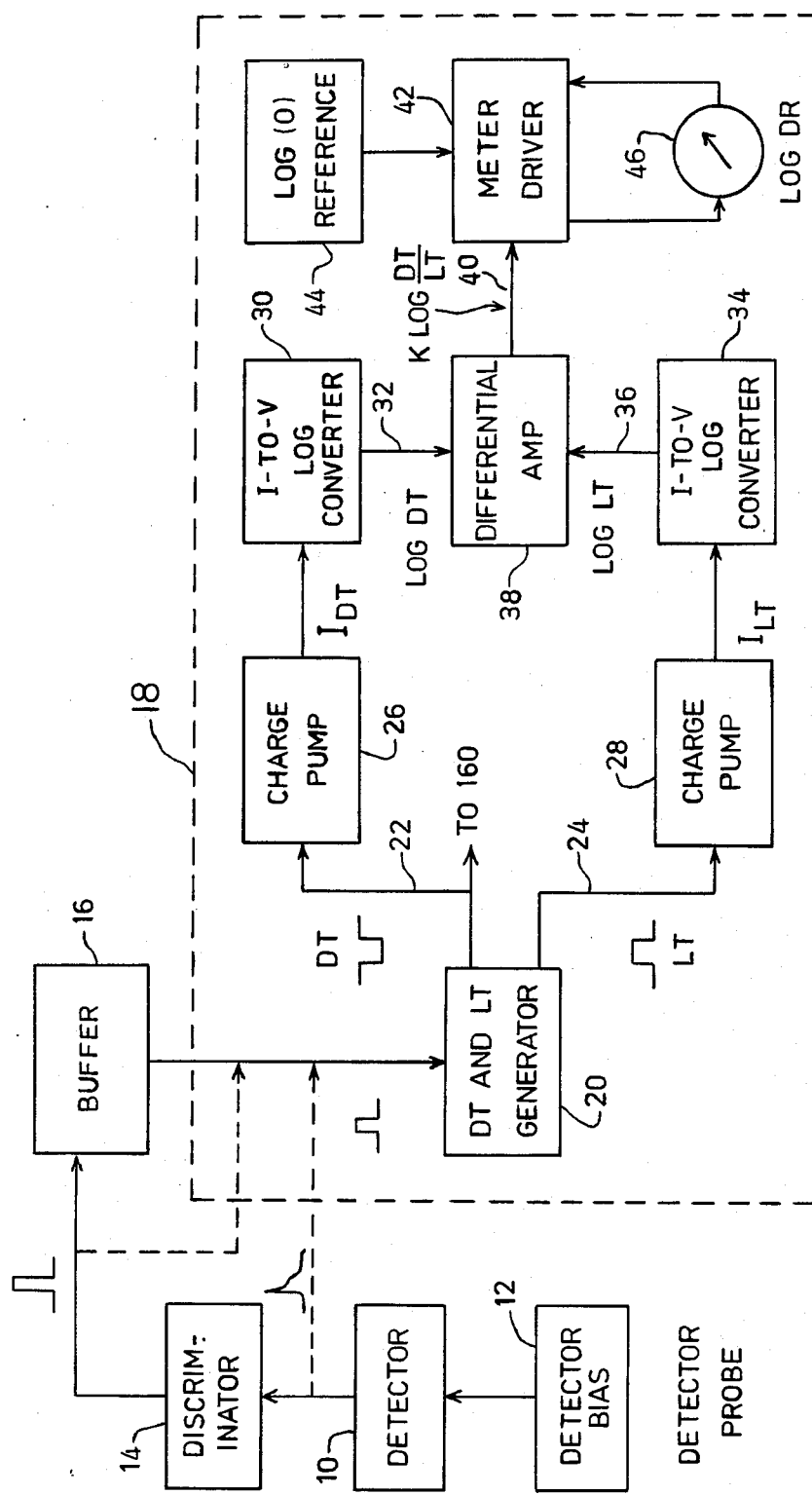
FIG. 1 is an overall block diagram of a circuit for the practice of the present invention.

An equation was stated above relating the observed count rate or count per unit time n to the actual count per unit time N. That equation is:

$$N = \frac{n}{1 - nt_d} \quad (2)$$

where $t_d$ is the dead time of the system. An algebraic manipulation of the relation between count rates leads to the following relation:

$$Nt_d = \frac{nt_d}{1 - nt_d} \quad (3)$$

Since there is one interval of dead time per pulse, the numerator of this equation is equal to the total dead time per unit time, while the denominator is equal to the time between pulses or total live time per unit time. The dead time per pulse, $t_d$, is a constant, so the fraction is proportional to N, the actual count per unit time.

$$N \alpha \frac{nt_d}{1 - nt_d} \quad (4)$$

If the observed count rate n is expressed in events per second, then the units of N are counts per second.

The range of count rates N is typically several decades. This is the difference between the normal background and the radiation level associated with count rates that present a health hazard. An ideal rate meter would respond to normal background rates and yet not overload or saturate in the presence of the higher levels of radiation. A way to accomplish this result in a rate meter is to express N on a logarithmic scale. This can be derived by further algebraic manipulation of equation 4. The exposure rate (DR), generally expressed in units of milliRoentgens per hour, is directly proportional to the actual count rate (N). Therefore:

$$DR \, \alpha \, N \, \alpha \frac{nt_d}{1 - nt_d} \quad (5)$$

Since $nt_d$=dead time per unit time (DT); and $1-nt_d$=live time per unit time (LT); then:

$$DR \, \alpha \, \frac{DT}{LT} \quad (6)$$

It follows that:

$$\text{Log } DR \, \alpha \, \log \frac{DT}{LT}, \quad (7)$$

$$\text{Log } DR \, \alpha \, (\text{Log } DT - \text{Log } LT), \text{ and} \quad (8)$$

$$\text{Log } DR = K \, (\text{Log } DT - \text{Log } LT) \quad (9)$$

A circuit for accomplishing this is shown in FIG. 1, which is an overall block diagram of the circuit for the practice of the present invention. In FIG. 1, a detector 10 is preferably a Geiger-Mueller tube, although the present invention would work equally as well with a scintillation detector, a proportional counter or any detector of ionizing events that exhibits dead time. The detector 10 is rendered operable by a bias circuit 12 which applies an appropriate voltage or voltages to the elements of the detector 10. The detector 10 produces an output pulse that may be used directly as an input to the circuit of the present invention or may be shaped in a discriminator 14 to produce as an output pulses of uniform height and width.

The output of the discriminator 14 may be taken directly to the circuit 18 of the present invention or it may be desirable to connect through a buffer 16. In an embodiment of the invention that has been built and tested, the detector 10 was a Geiger-Mueller tube that operated from a high-voltage power supply driven by a nine-volt power supply, while the circuit 18 of the present invention operated at a five-volt level. In such a case, it was necessary to use a buffer 16 to reduce the level of the output signal from the discriminator 14.

The output of the buffer 16 is taken in the circuit 18 to a dead-time and live-time pulse generator 20. The pulse generator 20 produces on the line 22 a pulse of a predetermined length representing an imposed period of dead time for each pulse received from the buffer 16 outside the dead time. The pulse generator 20 generates on a line 24 a pulse that represents the live time for each pulse received from the buffer 16 outside the dead time. The live time of the pulse on the line 24 is the time between pulses representing dead time. During the period represented by the live-time pulse on line 24, the detector is ready to receive a pulse resulting from the detection of an event at detector 10. When the live time is large in comparison to the dead time, the dead time has a relatively small effect on measurement of the number of incidents detected at detector 10. As the count rate increases, the live time is decreased while the dead time stays constant. The dead time thus has an increasingly large impact on the measurement. The circuit of FIG. 1 is an analog of equation (9), producing an output that is proportional to the average number of events occurring at detector 10. This is accomplished by connecting line 22 to a charge pump 26, which produces a current that is proportional to the average value of the dead time. Line 24 is connected to a charge pump 28, which produces a current equal to the average value of the live time. Each of the averages referred to is a running average of the length of the time pulses over a period of the order of one second. The output of the charge pump 26 is taken to a current-to-voltage log converter which produces on a line 32 an output that is proportional to the log of the average value of the dead time. The output from the charge pump 28 is taken to a current-to-voltage log converter 34 which produces on a line 36 an output that is proportional to the log of the average value of the live time. The lines 32 and 36 are taken as inputs to a differential amplifier 38 which produces on a line 40 a signal that is proportional to the difference of the logs of the dead time and the live time. This difference has been shown to be proportional to the dose rate present at the detector 10. The line 40 is connected to a meter driver 42, which is referenced to a signal from a reference unit 44. The output of the meter driver 42 is taken to a meter 46 that displays a value in mR/hr, corresponding to the number of counts produced by the detector 10, corrected as described, for the effect of dead time.

Figure 2:
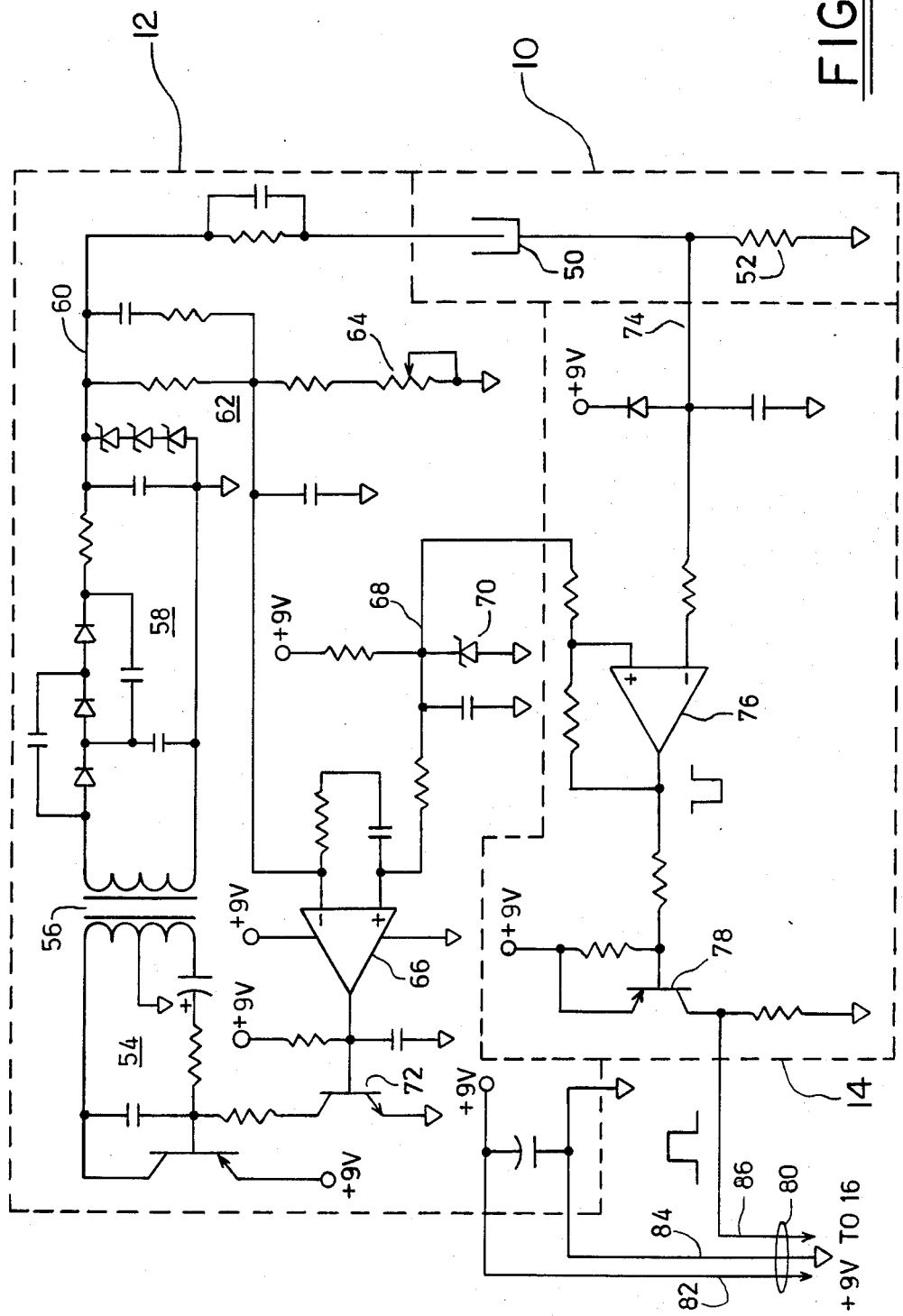
FIG. 2 is a detailed circuit diagram of the detector, discriminator and buffer circuits of FIG. 1.

FIG. 2 is a detailed circuit diagram of the detector 10, detector bias circuit 12, discriminator 14 and buffer 16 of FIG. 1. In FIG. 2, the detector 10 has a Geiger-Mueller (GM) tube 50 that is connected to ground through a resistor 52. Voltage for the GM tube 50 is supplied from the bias circuit 12 which comprises an oscillator 54 that is connected through a transformer 56 to a voltage tripler circuit 58. For a GM tube 50, this produces a voltage of the order of 500 to 600 volts on a line 60. If the detector 10 were a scintillation counter or other device for detecting ionizing events, the bias supply 12 would be operated to produce an appropriate voltage.

The voltage on the line 60 is controlled by a feedback circuit that selects a portion of the voltage on the line 60 by using a voltage divider 62. A potentiometer 64 is adjustable to trim the amount of the feedback voltage which is taken as an input on an inverting terminal of a comparator 66. The comparator reference voltage is developed on line 68 as determined by a band gap reference 70. The comparator 66 produces an output that drives a transistor 72 to control the operation of the oscillator 54.

The output of the detector 10 develops a voltage across the resistor 52 that is taken to the discriminator 14 on a line 74. The voltage on the line 74 is taken to a comparator 76 where it is compared with the reference voltage on the line 68. The output of the comparator 76 is a square wave of approximately 50 microseconds duration which occurs each time an ionizing event causes GM tube 50 to conduct. The output of the comparator 76 is taken to the line driver 78, a transistor that inverts the input and drives the signal on the probe cable.

All of the components of FIG. 2 can be readily contained in a hand-held probe that is supplied through a cable 80 that supplies nine volts dc on a line 82 and a ground on a line 84. A line 86 takes the output of the discriminator 16 to the circuit 18 of FIG. 1. It is an operating advantage to supply low voltage to the probe and to have the relatively high operating voltage of the GM tube 50 generated within the probe.

Figure 3:
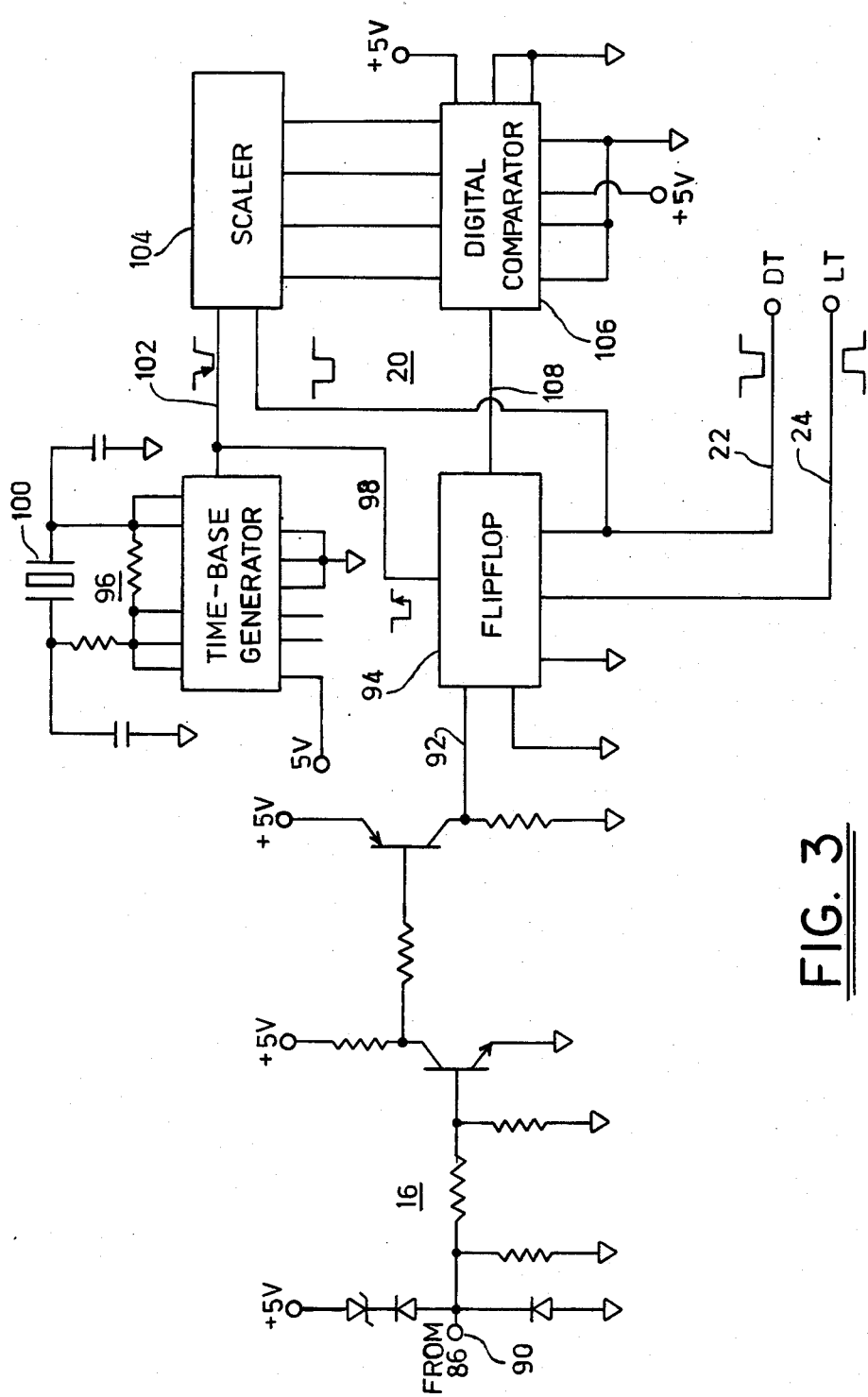
FIG. 3 is a detailed circuit diagram of the dead time and live time generator of FIG. 1.

FIG. 3 is a detailed circuit diagram of the buffer 16 and a portion of the circuit 18 of FIG. 1. In FIG. 3 a terminal 90 is connected to the output of the discriminator 14. This supplies an input to the buffer 16 that adapts the signal on the line 86 for a five-volt circuit. The output of the buffer 16 is taken on a terminal 92 to a flipflop 94. A time-base generator 96 generates a time base with rectangular pulses that are taken on a line 98 to provide a clock signal for the flipflop 94. The intervals of the time base 96 are controlled by the ceramic resonator 100 at values typically of the order of one microsecond. Time-base signals are also taken on a line 102 to a scaler 104. The scaler 104 produces a plurality of outputs representing scaled versions of the time-base signals representing counts of 64, 128, 256 and 512 microseconds. A desired interval is selected by a digital comparator 106, which produces on a line 108 an output signal that resets the flipflop 94.

The operation of the pulse generator 20 is as follows. An enabling pulse is received on the line 92 each time the detector 10 of FIG. 1 detects an ionizing event. The pulse on the line 92 is a rectangular pulse, of the order of 50 microseconds in duration, that is level shifted by buffer 16 to operate with five-volt components. The time-base generator 96 supplies a trigger pulse, once each microsecond, to the flipflop 94. When the trigger pulse and enable pulse are coincident, the flipflop 94 generates on the line 24 a pulse corresponding to live time and on the line 22 a pulse corresponding to dead time. The dead time pulse on line 22 provides reset control for the scaler 104. Initiation of a dead time pulse removes the reset, allowing scaler 104 to count time-base pulses received on the line 102 from the time base 96. When the predetermined time interval has been counted by the comparison circuit 106, an output signal is generated on the line 108 that resets the flipflop 94. This terminates the dead-time pulse on the line 22 and its complement, the live-time pulse, on the line 24. The scaler 104 is again held in reset awaiting a dead time pulse from flipflop 94. There is no further action in the circuit until receipt of the next input pulse on the line 92. The result is a dead-time pulse of a predetermined duration on the line 22 each time an event is detected, and the complement of that pulse on the line 24. The pulse generator is jam-proof, in that a continuous (active high) signal on the enable input line 92 results in a retrigger of the pulse generator 0.5 microsecond after completion of a cycle of operation. This helps assure the instrument will not saturate in extremely high radiation fields.

Figure 4A:
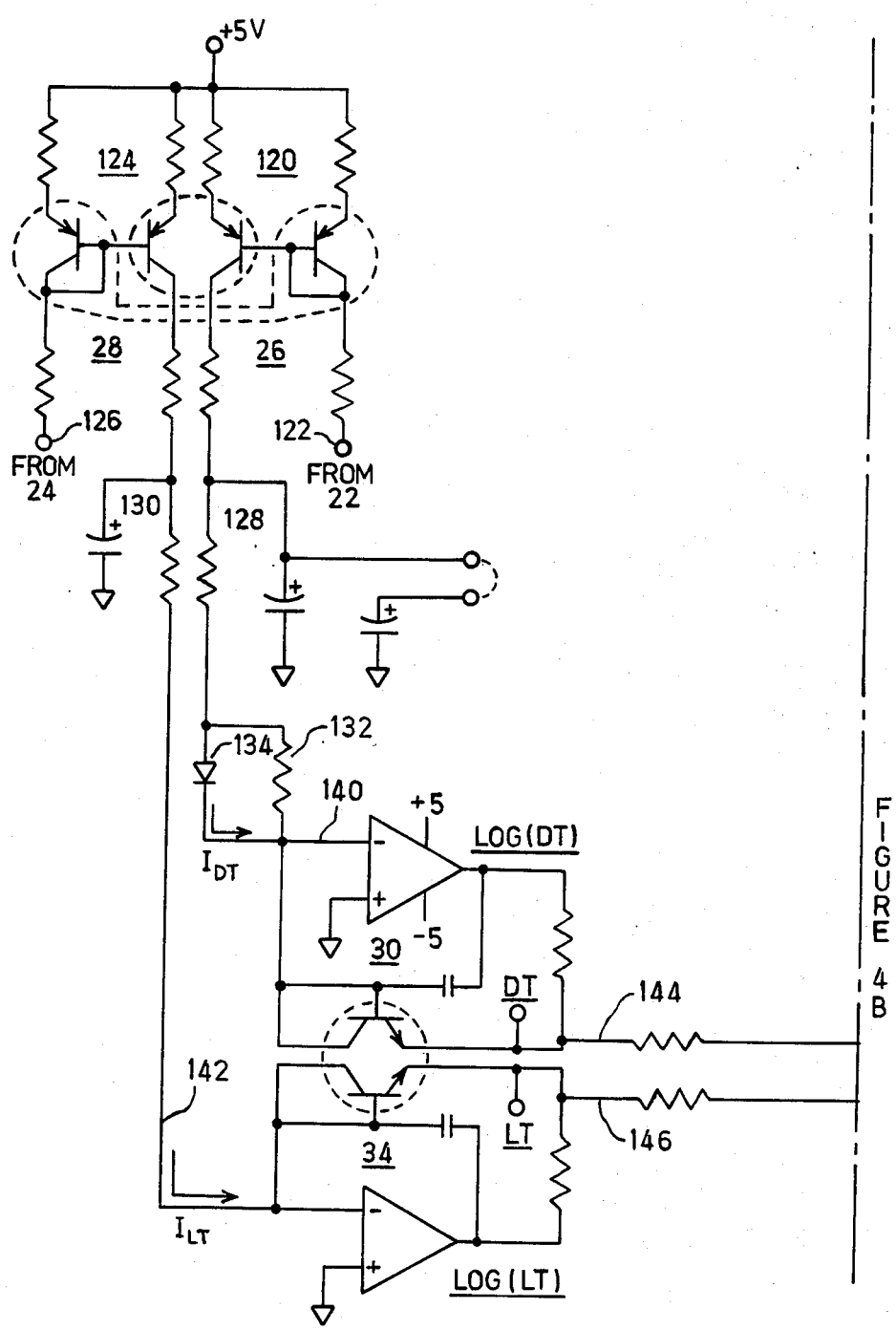
FIGS. 4A and 4B are a detailed circuit diagram of the charge pumps, log converters, and meter output circuit of FIG. 1.
Figure 4B:
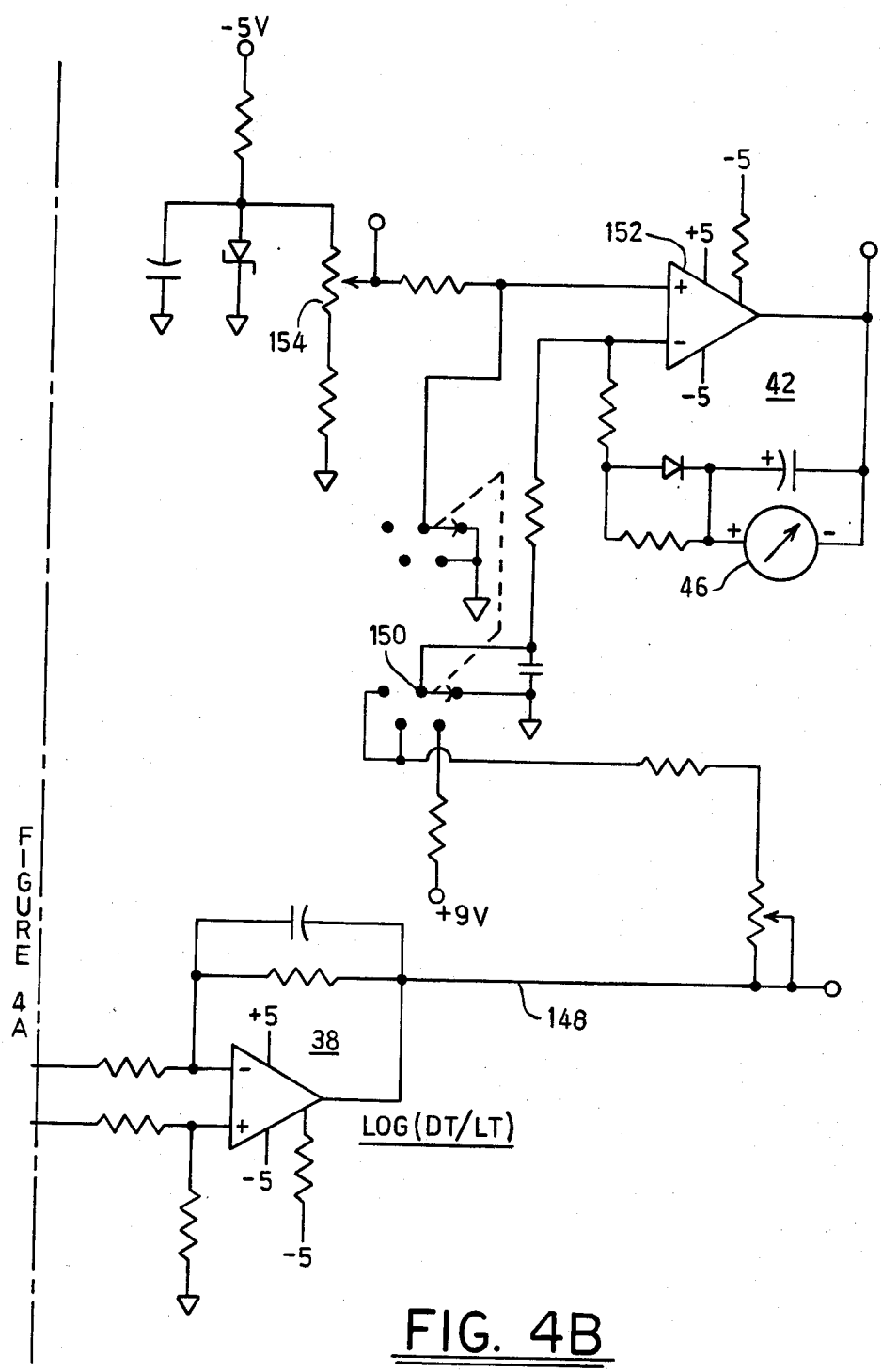

FIGS. 4A and 4B are a detailed circuit diagram of the remaining elements of FIG. 1. In FIG. 4A, a first current mirror 120 responds to a signal received on terminal 122 from the line 22. A second current mirror 124, matched to be equivalent to the first current mirror 120, receives on a terminal 126 a signal from the line 24. The first current mirror 120 thus produces a current that is proportional to the dead-time pulse from the generator 20, and the second current mirror 124 produces a current that is proportional to the live-time pulse from the generator 20. Current in the first current mirror 120 is integrated by a first RC network 128 so that the combination of the first current mirror 120 and the first RC network 128 comprises a charge pump. Similarly, the current in the second current mirror 124 is integrated in a second RC network 130 to comprise a second charge pump. The time constant of the first RC network 128 is adjusted further by a parallel combination of a resistor 132 and a diode 134. The parallel combination represents the equivalent of a variable resistor that is a part of the second time constant. The result is to produce on a terminal 140 a current that is proportional to the time-averaged dead-time and a current on a terminal 142 that is proportional to the time-averaged live time. The terminals 140 and 142 are connected to a matched pair of current-to-voltage log converters 30 and 34, respectively, producing at a terminal 144 a voltage that is proportional to the log of the average value of the dead time and at a terminal 146 a voltage that is proportional to the log of the average value of the live time. These voltages are subtracted in a differential amplifier 38 (FIG. 4B) to produce on a terminal 148 a voltage that is proportional to the difference of the logs of the average value of the dead time and the live time. This is proportional to the log of the ratio of average dead time to average live time, which has been shown to be a corrected measure of the pulse count.

The terminal 148 is connected through a switch 150 to a meter driver 42. This comprises an amplifier 152 that drives a meter 46 with a current determined from the voltage difference between terminal 148 and a reference unit 44. The reference unit 44 is a voltage divider that includes a bandgap reference 156 and a potentiometer 154 that is adjustable to select a reference value for the meter 46. The result is to produce on the meter 46 an indication that is a logarithmically scaled value that is proportional to the count of ionizing events detected at the detector 10, compensated as described for the effects of dead time.

Figure 5:
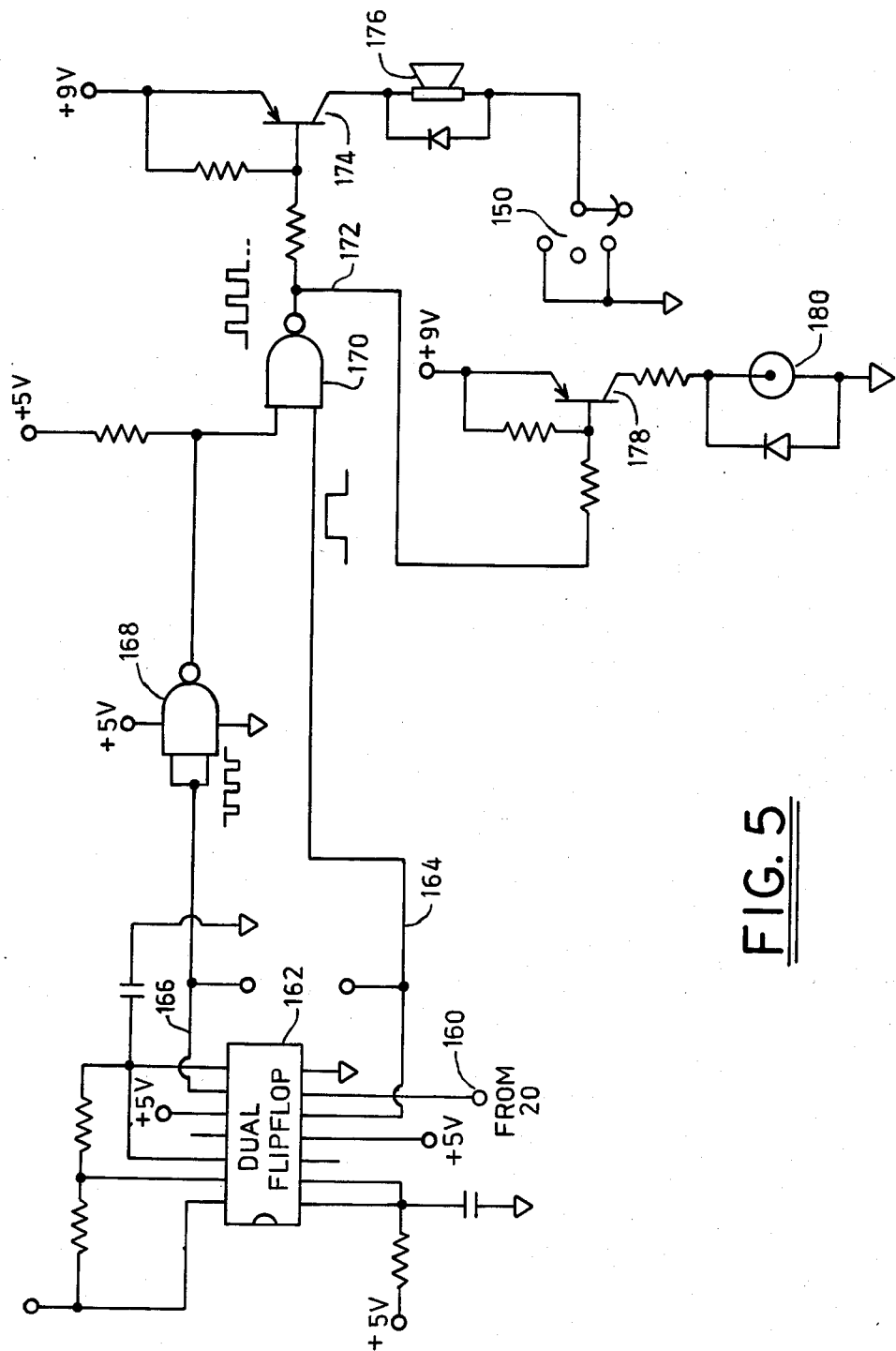
FIG. 5 is a detailed circuit diagram of a circuit for producing an audible indication of detected events.

In addition to the metered display on the meter 46, it is often useful to have an audible indication of the operation of a detector. This is supplied by the circuit of FIG. 5. An input from the pulse generator 20 of FIG. 1 supplies at a terminal 160 a pulse for each ionizing event. This is the dead time signal on the terminal 22 of FIG. 1. The signal on the terminal 160 of FIG. 5 triggers one half of a dual flipflop 162 that produces on a line 164 a one-millisecond gating pulse. The other half of the dual flipflop 162 is set to run freely, producing a pulse sequence on a line 166 that is inverted using the invertor 168 and then taken as one input to a NAND gate 170. The terminal 164 is taken as a second input to the NAND gate 170, gating the pulse sequence on line 166 for approximately one millisecond for every event that is detected at the detector 10 of FIG. 1. The output on the line 166 is conveniently produced with a duty cycle of less than 50% to reduce the energy dissipation, a matter of importance if the circuit of the present invention is powered by batteries.

The output of the NAND gate 170 is taken on a terminal 172 to a transistor 174 that amplifies the signal on the terminal 172 and drives a speaker 176 when it is selected by the switch 150. The terminal 172 is also connected to supply an input to a transistor 178 which supplies an output for earphones that can be plugged into a phone jack 180.

The circuit described above has been applied to produce a battery-powered portable rate meter that applies the correction of equation (1) uniformly across a range of three decades without changing scales. It is adaptable for a wider range (five or more decades), depending on the application. It is adaptable for use with GM tubes, scintillator-photomultipliers, or proportional counters, and needs only minor adjustment when a detector is changed. The circuit can readily be changed to set different values of circuit dead time if that is desired. Thus, the objects of the invention have been achieved. Further expansions of the invention, utilizing the relationship of DT/LT to exposure rate (equation 6), would include digital or linear hardware solutions.

While in the foregoing specification this invention has been described in connection with specific apparatus and applications, it is to be understood that this description is made by way of example, and not as a limitation on the scope of the invention. The scope of the invention should be limited only by the following claims.

The embodiments of this invention in which an exclusive property or privilege is claimed are defined as follows:

1. A comprension circuit for an event detector that is used to count occurences of random events occurring at variable rates, the event detector having a characteristic live time during which a single event is detectable and having an actual dead time after the detection of an event during which the detector is disabled from detecting events, the compensation circuit compensating for the occurence of events during the dead time, the compensation circuit comprising:

means for generating a dead-time pulse of predetermined duration at least equal to the actual dead time, the dead-time pulse intitiated by detection of the occurrence of one of the random events;

means for generating a live-time pulse corresponding to a time interval between the end of a dead-time pulse and the beginning of a following period of dead-time pulse;

means responsive to the means for generating a live-time pulse for averaging live-time pulses over time;

means responsive to the means for generating a dead-time pulse for averaging dead-time pulses over time;

means for obtaining a first voltage that is an analog of the logarithm of the average live-time pulses;

means for obtaining a second voltage that is an analog of the logarithm of the averaged dead-time pulses time; and means for subtracting the first voltage from the second voltage to obtain a third voltage that is an analog of a count rate that is corrected for the occurrence of undetected events occurring during dead time.

2. The apparatus of claim 1 wherein the means for obtaining a dead-time pulse comprise a flipflop that is triggered on by the reception during a period of time when the flipflop is reset of a signal indicating the detection of an event and which is turned off after a predetermined time.

3. The apparatus of claim 2 wherein the live-time pulse is the complement of the dead-time pulse.

4. The apparatus of claim 3 wherein the means for averaging the live-time pulse over time comprises a first charge pump receiving as an input the live-time pulses produced by the flipflop and producing as an output a current that is an analog of an average value of live time.

5. The apparatus of claim 4 wherein the means for averaging the dead-time pulses over time comprises a second charge pump receiving as an input the dead-time pulses from the flipflop and producing as an output a current that is an analog of an average value of dead time.

6. The apparatus of claim 5 wherein the means of determining the analog of the logarithm of the averaged live time pulses comprises a first log converter receiving as an input the output of the first charge pump, and producing as an output a voltage that is proportional to the logarithm of the average value of the live time.

7. The apparatus of claim 6 wherein the means of determining the analog of the logarithm of the averaged dead time pulses comprises a second log converter connected to the second charge pump and receiving as an input a current proportional to the average value of the dead time, the second log converter producing as an output a voltage that is proportional to the logarithm of the average value of the dead time;

8. The apparatus of claim 7 wherein the means of subtracting the voltage logarithms of the input currents to provide an output analog of a count rate corrected for dead time losses comprises a differential amplifier connected to the first and second log converters and producing as an output a voltage that is proportional to the difference between the output of the first log converter and the output of the second log converter; and a meter driver connected to the differential amplifier, the meter driver receiving as an input the output of the differential amplifier and producing as an output a meter drive signal that is proportional to the corrected count rate.

9. In a radiation rate survey meter used to detect particles and photons, the meter including a detector having a detector dead time during which the detector is not responsive to detect particles or photons and a circuit for converting the detector dead time to a predetermined value of dead time equal to the width of an event pulse indicating the detection of a particle or a photon, a circuit for compensating a measured event rate determined by the rate survey meter for particles or photons incident during the circuit dead time comprising:

a dead-time and live-time generator receiving as an input an event dead-time pulse corresponding to incidence of each detected particle or photon and producing as outputs at a first terminal a dead-time pulse of predetermined width corresponding to each received event dead-time pulse and a live-time pulse that is the complement of the dead-time pulse;

a first charge pump connected to the dead-time and live-time generator and receiving as an input the dead-time pulse, the first charge pump producing as an output a current that is proportional to the time-average value of the dead time;

a second charge pump connected to the dead-time and live-time generator and receiving as an input the live-time pulse; the second charge pump producing as an output a current that is proportional to the time-average value of the live-time pulse;

a first log converter receiving as an input the output of the first charge pump and producing as an output a voltage that is proportional to the logarithm of the average value of the dead time;

a second log converter connected to the second charge pump and receiving as an input a current proportional to the average value of the live time, the second log converter producing as an output a voltage that is proportional to the logarithm of the average value of the live time;

a differential amplifier connected to the first and second log converters and producing as an output a voltage that is proportional to the difference between the output of the first log converter and the output of the second log converter; and a meter driver connected to the differential amplifier, the meter driver receiving as an input the output of the differential amplifier and producing as an output a meter drive signal that is proportional to the corrected count rate.

* * * * *